(12) United States Patent
Foster

(10) Patent No.: US 8,443,612 B2
(45) Date of Patent: May 21, 2013

(54) ENGINE MOUNTING ARRANGEMENT

(75) Inventor: Lawrence David Foster, Toulouse (FR)

(73) Assignee: Rolls-Royce PLC, London (GB)

( * ) Notice: Subject to any disclaimer, the term of this patent is extended or adjusted under 35 U.S.C. 154(b) by 748 days.

(21) Appl. No.: 12/481,944

(22) Filed: Jun. 10, 2009

(65) Prior Publication Data
US 2009/0308078 A1    Dec. 17, 2009

(30) Foreign Application Priority Data

Jun. 11, 2008   (GB) .................................. 0810589.2

(51) Int. Cl.
*F02C 7/20*   (2006.01)
*F02K 3/04*   (2006.01)
*B64D 27/16*  (2006.01)

(52) U.S. Cl.
USPC ................................. 60/797; 60/796; 244/54

(58) Field of Classification Search
USPC ........................................ 60/796, 797; 244/54
See application file for complete search history.

(56) References Cited

U.S. PATENT DOCUMENTS

| | | | |
|---|---|---|---|
| 5,275,357 A | 1/1994 | Seelen et al. | |
| 5,320,307 A | 6/1994 | Spofford et al. | |
| 5,351,930 A | 10/1994 | Gwinn et al. | |
| 5,620,154 A * | 4/1997 | Hey | 60/797 |
| 5,725,181 A | 3/1998 | Hey | |
| 5,871,175 A | 2/1999 | Demouzon et al. | |
| 5,871,176 A | 2/1999 | Demouzon et al. | |
| 5,873,547 A | 2/1999 | Dunstan | |
| 6,059,227 A | 5/2000 | Le Blaye et al. | |
| 6,330,995 B1 * | 12/2001 | Mangeiga et al. | 244/54 |
| 6,341,746 B1 | 1/2002 | Pascal et al. | |
| 6,648,271 B2 * | 11/2003 | Levert et al. | 244/54 |
| 6,758,438 B2 | 7/2004 | Brefort et al. | |
| 7,021,585 B2 | 4/2006 | Loewenstein et al. | |
| 7,108,224 B2 | 9/2006 | Pasquer et al. | |
| 2001/0025902 A1 | 10/2001 | Jule et al. | |
| 2002/0104924 A1 * | 8/2002 | Roszak | 244/54 |
| 2003/0025033 A1 | 2/2003 | Levert et al. | |
| 2003/0066928 A1 | 4/2003 | Brefort et al. | |
| 2004/0251380 A1 | 12/2004 | Pasquer et al. | |

(Continued)

FOREIGN PATENT DOCUMENTS

| | | |
|---|---|---|
| EP | 0564126 A1 | 10/1993 |
| EP | 1 103 463 A1 | 5/2001 |
| EP | 1 136 355 A1 | 9/2001 |
| EP | 1129942 A3 | 12/2001 |
| EP | 2133268 A2 | 12/2009 |
| EP | 2133269 A2 | 12/2009 |

OTHER PUBLICATIONS

Aug. 7, 2012 Search Report issued in European Patent Application No. EP 09 25 1291.

*Primary Examiner* — Ted Kim
(74) *Attorney, Agent, or Firm* — Oliff & Berridge, PLC (57) ABSTRACT

An engine mounting apparatus having a yoke carrier block and a main mount block, the yoke carrier block being connectable to the main mount block, the main mount block being connected to the engine by at least one engine attachment link for transferring loads from an engine in a normal load path during normal operation of the engine mounting arrangement, characterized in that the yoke carrier block is connected to a further engine attachment link independently of the main mount block, the further engine attachment link being unloaded during normal operation of the engine mounting arrangement and arranged to transfer loads from the engine in the event of a failure of one or more components in the normal load path.

6 Claims, 7 Drawing Sheets

U.S. PATENT DOCUMENTS

2005/0067528 A1  3/2005  Loewenstein et al.
2006/0219841 A1  10/2006  Dron et al.
2006/0231679 A1*  10/2006  Chamberlain ................ 244/54
2007/0138337 A1  6/2007  Audart-Noel et al.

* cited by examiner

ENGINE MOUNTING ARRANGEMENT

CROSS REFERENCE TO RELATED APPLICATION

This application is entitled to the benefit of British Patent Application No. GB 0810589.2, filed on Jun. 11, 2008.

FIELD OF THE INVENTION

The present invention relates to an engine mounting arrangement and is particularly concerned with a mounting arrangement for attaching an aircraft engine to an aircraft pylon.

BACKGROUND OF THE INVENTION

Figure 1:
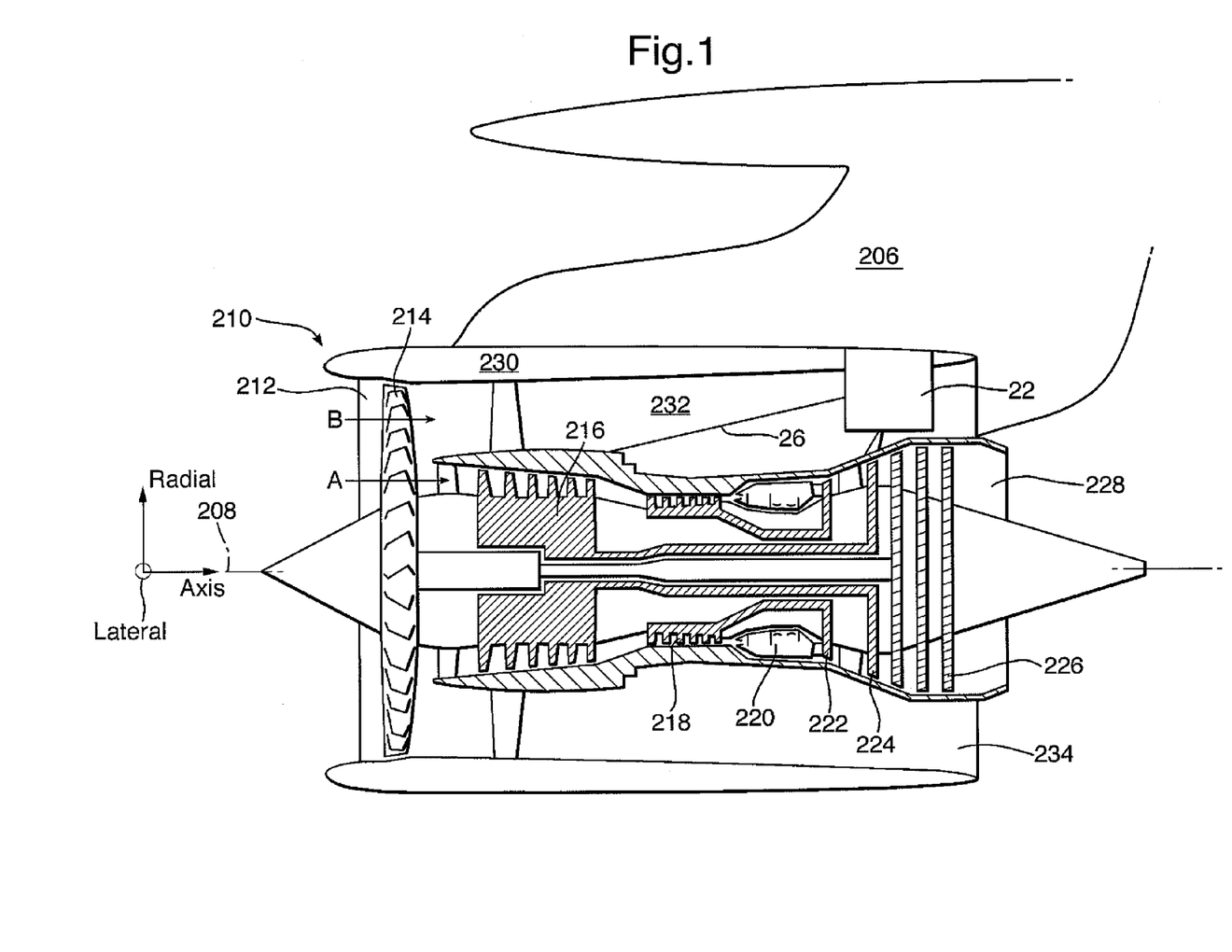
FIG. 1 is a sectional side view of a gas turbine engine having a conventional rear engine mounting apparatus.

A gas turbine engine 210 is shown in schematic section in FIG. 1 and comprises a main rotational axis 208, an air intake 212 and a propulsive fan 214 that generates two airflows A and B. The gas turbine engine 210 comprises, in axial flow A, an intermediate pressure compressor 216, a high pressure compressor 218, a combustor 220, a high pressure turbine 222, an intermediate pressure turbine 224, a low pressure turbine 226 and an exhaust nozzle 228. A nacelle 230 surrounds the gas turbine engine 210 and defines, in axial flow B, a bypass duct 232 between the air intake 212 and an exhaust nozzle 234. A rear engine mounting arrangement 22 (rear in the sense of airflows A and B) is shown in the vicinity of the turbines 222, 224, 226. Thrust struts 26 connect the rear engine mounting arrangement 22 with a forward section of the engine 210. The rear engine mounting arrangement 22 is connectable to an aircraft pylon 206 and is located at a radially outer extent of the engine 210, Preferably, at top dead centre. For the purposes of the following description, this will be taken to be vertically above the engine although it should be understood that the engine 210 may be hung at an angle to the vertical.

An engine 210 is conventionally mounted on an aircraft, whether under a wing or against a fuselage by each of a front and a rear mounting arrangement. Where the engine is a gas turbine engine 210, the front mounting is generally provided in the vicinity of the fan 214 or compressors 216, 218 and the rear mounting is generally provided in the vicinity of the turbines 222, 224, 226. However, other arrangements are possible. The rear mounting arrangement 22 comprises means for connection of thrust struts 26 to transfer the thrust generated by the engine 210 through the mounting arrangement 22 and the pylon 206 to the aircraft. The rear engine mounting arrangement 22 also comprises means to transfer vertical and side loads from the engine 210 through the pylon 206 to the aircraft. Typically a forward engine mounting arrangement (not shown) is also provided. Preferably, in the vicinity of the compressors of a gas turbine engine 210 to transfer engine side and vertical loads but not thrust loads.

Figure 2:
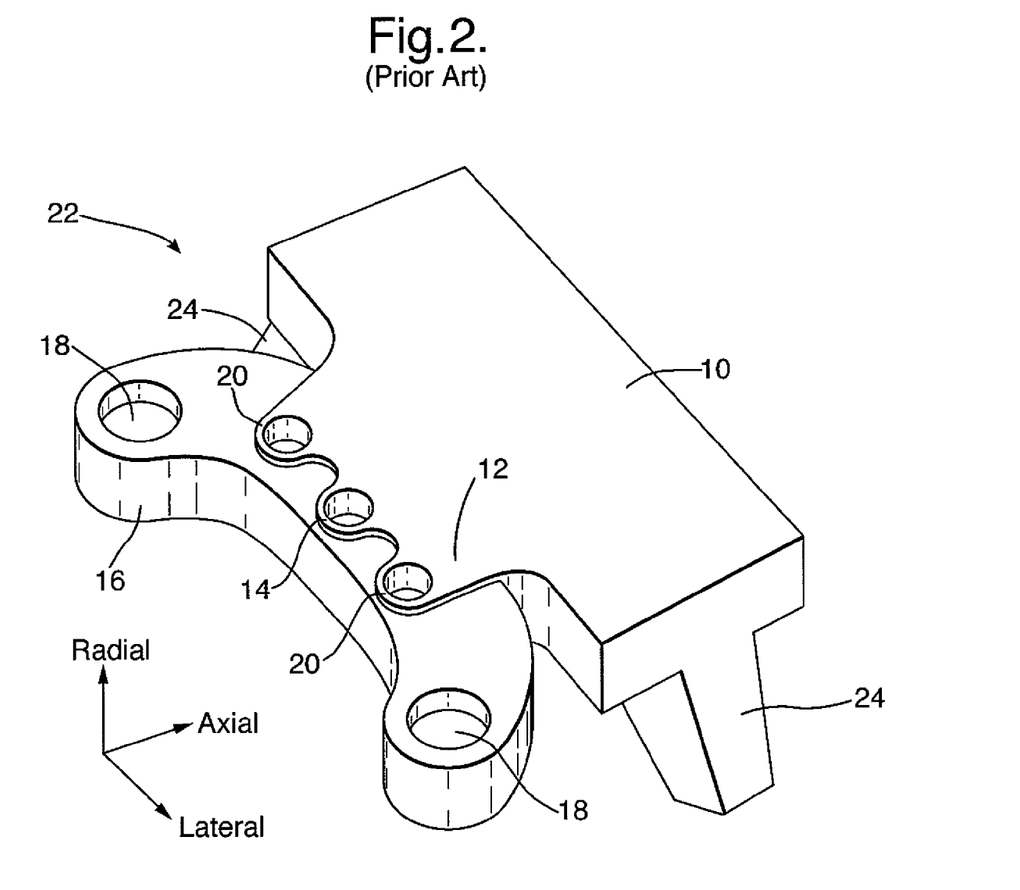
FIG. 2 is a highly schematic perspective view of an engine mounting apparatus according to the prior art as described above.

A conventional rear engine mounting arrangement 22 is shown in FIG. 2 in highly schematic form. The arrangement comprises a mount block 10 that includes means to attach it to the aircraft pylon 206 and two engine attachment links 24 for connection to the engine 210. It further comprises an integral clevis arrangement 12 protruding forward from the main body of the mount block 10. The clevis arrangement 12 has a main thrust connection 14, which is connectable to a thrust yoke 16 by a pivot pin or similar, and a pair of catcher devises 20 located on either side of the main thrust connection 14 that define a clearance around their respective pins. The yoke 16 is connected to the thrust struts 26 (FIG. 1) at connection points 18 by pin and clevis arrangements. Thus the propulsive thrust loads are transferred from the engine 210 through the thrust struts 26, yoke 16, main thrust connection 14 and mount block 10 and from there into the pylon 206 of the aircraft. In the event of a failure of the main thrust connection 14, the clearance in the catcher devises 20 is taken up and the thrust load transferred through these instead.

Conventionally, the two integral engine attachment legs 24 are provided at the lateral ends of the mount block 10. An integral catcher leg may also be provided intermediate the engine attachment legs 24 which transfers engine loads in the event of failure of one or both of the engine attachment legs 24. One disadvantage of this engine mounting arrangement is that a failure crack emanating from either of the engine attachment legs 24, or the mount block 10 itself, can propagate through the mount block 10 to fail the adjacent catcher link without detection. Whilst this can be certified by crack growth and propagation analysis, this is an unsatisfactory solution since it requires heavier and stronger materials to ensure the minimal crack growth properties required. This is the case even with more complex arrangements of engine attachment legs 24 and catcher links described in the prior art.

Thus, it is desirable to have an engine mounting arrangement that has a failure load path that does not rely on crack growth and propagation analysis. The present invention seeks to provide a novel rear engine mounting arrangement that seeks to address the aforementioned problems.

SUMMARY OF THE INVENTION

Accordingly, the present invention provides an engine mounting arrangement having a yoke carrier block and a main mount block, the yoke carrier block being connectable to the main mount block, the main mount block being connectable to an engine by at least one engine attachment link for transferring loads from the engine in a normal load path during normal operation of the engine mounting arrangement, characterised in that the yoke carrier block is connectable to a further engine attachment link independently of the main mount block, the further engine attachment link being unloaded during normal operation of the engine mounting arrangement and arranged to transfer loads from the engine in the event of a failure of one or more components in the normal load path.

Preferably, the yoke carrier block and main mount block are secured together.

Preferably, the yoke carrier block comprises a catcher lug connectable to the further engine attachment link. More preferably, the catcher lug is coplanar with the at least one engine attachment link. This means the engine loads are transferred in a single plane, except the thrust loads, and thus reduces the likelihood of generating a torque force to put a twisting strain on connection means.

Preferably, the catcher lug extends through the main mount block. This enables it to be central thereto. More preferably, the main mount block defines a clearance with respect to the catcher lug so that no load passes therebetween during normal operation of the engine mounting arrangement.

Preferably, the further engine attachment link is connected to the main mount block. This provides an additional failure load path.

The connections may comprise clevis and pin arrangements.

Alternatively, other connection arrangements may be used.

Preferably, at least one thrust strut is connectable to the yoke carrier block to transfer loads from the engine during normal operation of the engine mounting arrangement. More preferably, the at least one thrust strut is connectable to the main mount block, the connection being arranged to be unloaded during normal operation of the engine mounting arrangement and to transfer loads from the engine in the event of failure of one or more components in the normal load path.

DETAILED DESCRIPTION OF THE PREFERRED EMBODIMENTS

Figure 3:
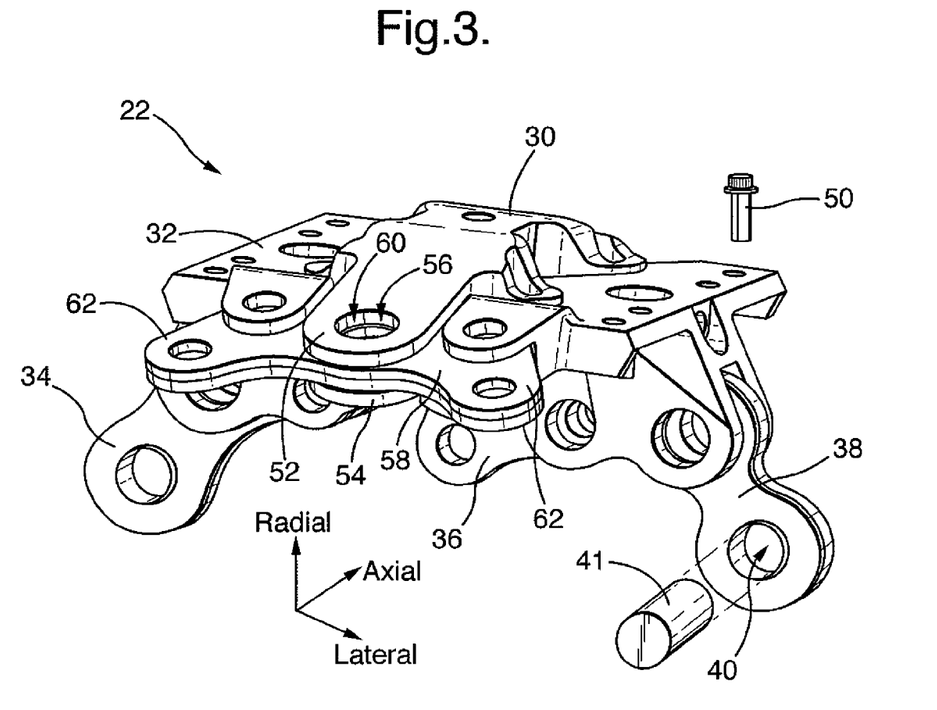
FIG. 3 is a perspective view of a rear engine mounting apparatus having a yoke carrier block and in accordance with the present invention.

Referring to FIG. 3, an exemplary embodiment of the rear engine mounting apparatus 22 of the present invention is shown. The apparatus 22 includes a yoke carrier block 30 and a main mount block 32 secured together. There are three engine attachment links, 34, 36, 38, which connect between corresponding attachment points on the engine 210 to one or both of the yoke carrier and main mount blocks 30, 32 as elaborated later. Preferably, the engine attachment links 34, 36, 38 are connected to points on the engine 210 by a clevis and pin arrangement. For example, the port side attachment link 38 is generally planar and elongate, and includes an aperture 40 containing a spherical bearing. The port side attachment link 38 sits within a complementary clevis fixed at a suitable location on a casing of the engine 210 and is secured by a pin 41 inserted through the aperture 40 (as shown by interrupted lines) and a complementary aperture in the clevis to connect them together. A similar arrangement is provided to connect the engine 210 to each of the starboard side 34 and central 36 attachment links. The connection arrangement of the engine attachment links 34, 36, 38 to the yoke carrier and main mount blocks 30, 32 will be described below.

An advantage of providing a clevis and pin arrangement between the engine 210 and the engine attachment links 34, 36, 38 of the rear engine mounting arrangement 22 is that differential thermal expansion does not place undue stress or strain on any of the components as some relative movement is permitted in at least an axial plane. However, other arrangements of connecting the engine attachment links 34, 36, 38 to the engine 210 are considered to fall within the scope of the present invention.

The yoke carrier block 30 of the rear mounting arrangement 22 of the present invention is now described with reference to FIG. 3 (showing both the yoke carrier and main mount blocks 30, 32) and FIGS. 4 and 5 (showing just the yoke carrier block 30 from above and below respectively). The yoke carrier block 30 presents a substantially rectangular profile and comprises a main portion 44 with a tongue 42 protruding forwardly therefrom. At each corner of the main portion 44 of the yoke carrier block 30 are feet 45 through which are defined apertures 46 that receive, in use, attachment bolts 50. Only one of the attachment bolts 50 is shown (FIG. 3) for clarity. The attachment bolts connect the yoke carrier block 30 to the main mount block 32. The underside of the feet 45 are substantially planar and abut the main mount block 32 whilst the underside of the main portion 44 of the yoke carrier block 30 is spaced apart from the main mount block 32.

Figure 4:
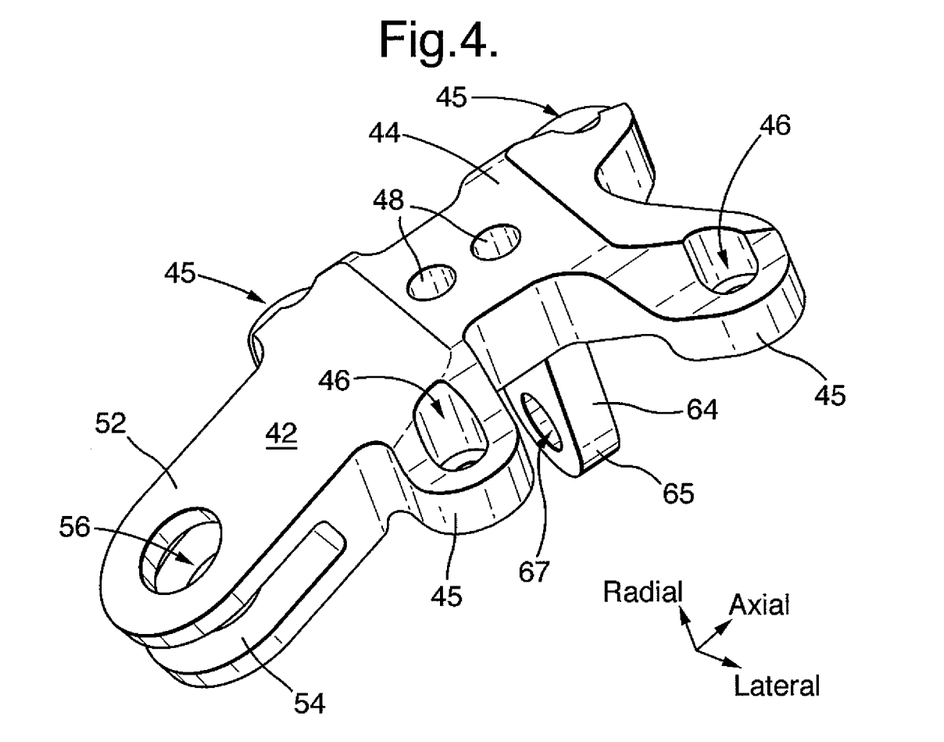
FIG. 4 is a perspective enlargement of the yoke carrier block of FIG. 3 viewed from above.
Figure 5:
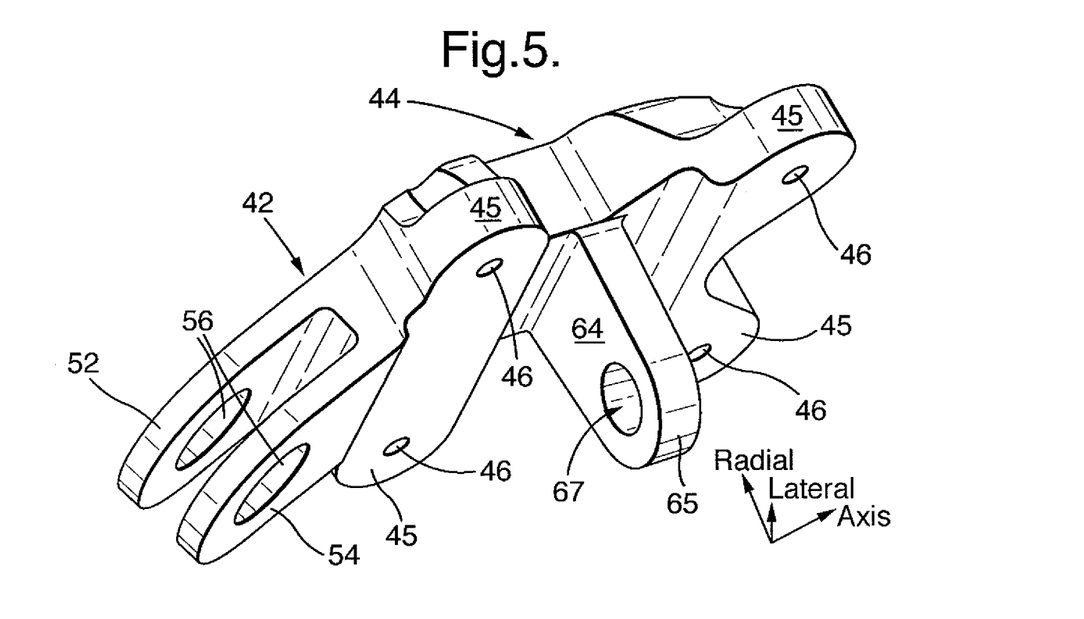
FIG. 5 is a perspective enlargement of the yoke carrier block of FIG. 3 viewed from below.

The main portion 44 further defines at least one shear pin aperture 48; two are shown in FIG. 4. In use, a corresponding number of shear pins extend from the aircraft pylon 206 and locate within the shear pin apertures 48 to transfer engine loads to the pylon 206. Alternatively, one shear pin may transfer the loads in normal operation and a second shear pin may be located within a shear pin aperture 48 with a clearance defined around it so that no loads are transferred under normal operating conditions. In the event of a failure of the main shear pin arrangement, the clearance is taken up and the loads are transferred through the second, or catcher, shear pin. The main portion 44 of the yoke carrier block 30 may be profiled so as to reduce the component weight without compromising the strength and stiffness characteristics, for example by providing concave edges.

The tongue 42 is preferably, provided in the form of a clevis having upper 52 and lower 54 lugs, which define apertures 56 therethrough, the apertures 56 are aligned to receive a pivot pin (not shown) through the plane of the lugs 52, 54. A thrust strut balance yoke 58 (FIG. 3) is located symmetrically within the clevis of the tongue 42 and comprises an aperture 60 therethrough that aligns with the apertures 56 through the tongue 42. The pivot pin therefore connects the thrust strut balance yoke 58 within the tongue 42. A clearance is provided between the thrust strut balance yoke 58 and the rear of the clevis formed by the tongue 42, in the plane of the thrust strut balance yoke 58 and the tongue 42, to enable the thrust strut balance yoke 58 to pivot around the pivot pin through apertures 56, 60 to balance the loads from the thrust struts 26. Preferably, the pivot pin is located in a spherical bearing to allow the thrust strut balance yoke 58 to self-align with the load paths to reduce internal stresses.

Two thrust struts 26 are provided, one being connected to the each of the lateral ends 62 of the thrust strut balance yoke 58, or more preferably, to forwardly extending protrusions thereof, by pins retained within spherical bearings or any other suitable means. Preferably, the connection is by means of a clevis arrangement to allow the thrust struts 26 and the balance yoke 58 to pivot relative to each other to compensate for variations in the thrust transmitted by each of the thrust struts 26. For each thrust strut 26, the clevis arrangement comprises a pair of lugs on one of the thrust strut 26 and the yoke 58, and a single lug on the other that sits between the pair of lugs. A pivot pin is inserted through aligned apertures, with a spherical bearing therein, to secure the thrust strut 26 and yoke 58 pivotably together.

The yoke carrier block 30 further comprises a catcher lug 64, the proximal end of which is attached to and extends from the underside of the block 30 at a substantially central position. The catcher lug 64 is planar and elongate, but could be cuboid, with an arcuate distal end 65. It is sized to take the loads imparted through it and, as illustrated, is substantially the same width as the main portion 44 of the yoke carrier block 30. The catcher lug 64 may comprise a chamfered join to the underside of the block 30 to relieve stresses. The distal end 65 defines an aperture 67 to receive an attachment pin therethrough as will be described more fully below. The attachment pin is, preferably, substantially aligned with the tongue 42, and therefore is generally aligned parallel to the main axis 208 of the engine 210. The catcher lug 64 is in the same axial plane as the engine attachment links 34, 36, 38.

Figure 6:
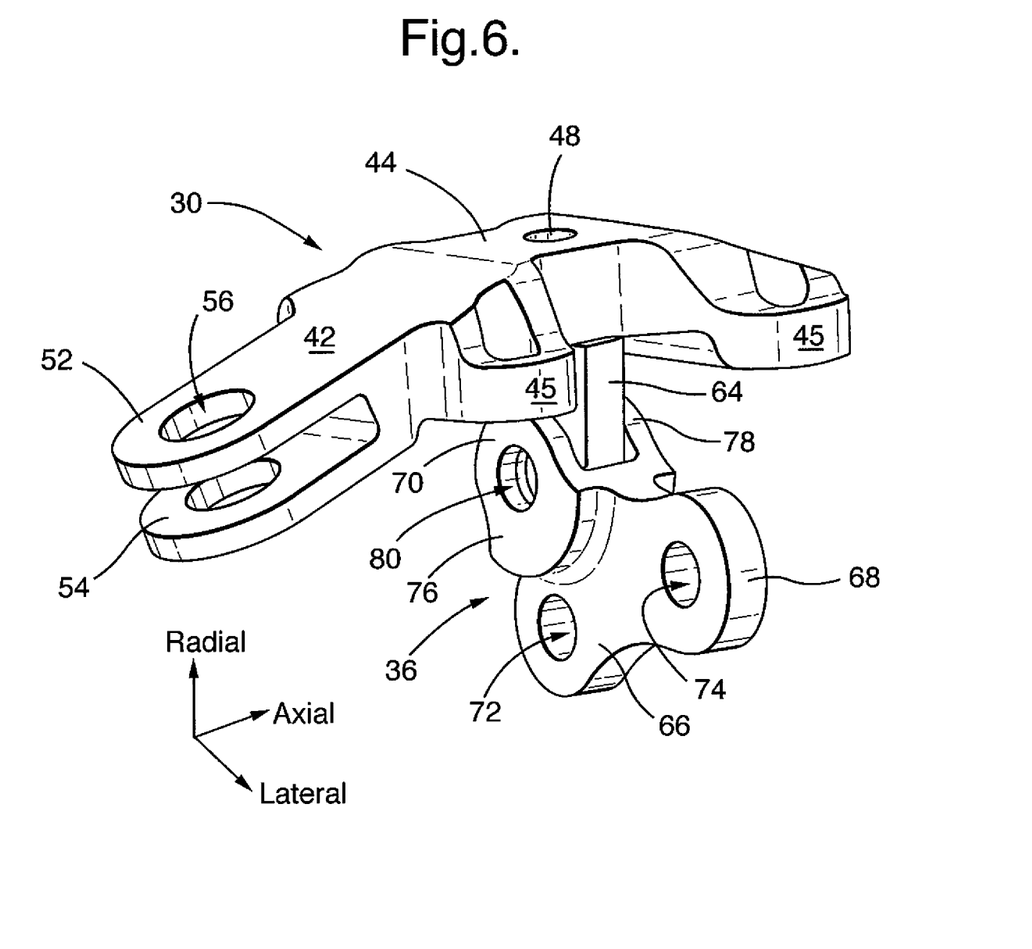
FIG. 6 is a perspective view of the yoke carrier block and a central engine attachment link.

FIG. 6 shows the yoke carrier block 30 and the central engine attachment link 36 mounted together, without the other components of the rear engine mounting arrangement 22. The central link 36 has the form of three lobes 66, 68, 70 in generally triangular relation and so arranged, in use, that a first of the lobes 66 extends towards the engine 210 for attachment thereto. This first lobe 66 defines an aperture 72. The first lobe 66 is received in a clevis arrangement on the engine casing and an attachment pin is inserted through aperture 72 in the lobe 66 and axially aligned apertures in the clevis to mount the central link 36 to the engine 210. The second lobe 68 extends to one side of the first lobe 66 and also defines an aperture 74 for receiving an attachment pin in use. The second lobe 68 is received in a clevis defined in the main mount block 32 as will be described hereinafter. The third lobe 70 is arranged to be substantially radially outwardly of the first lobe 66 and to engage with the catcher lug 64. It takes the form of a clevis having front and back lugs 76, 78, rather than the single lug of the first and second lobes 66, 68, the lugs 76, 78 defining apertures 80 therethrough. The clevis spacing is so arranged that the distal end 65 of the catcher lug 64 can be received between the front and back lugs 76, 78 of the third lobe 70. Preferably, the interior of the clevis is profiled to complement the shape of the distal end 65 of the catcher lug 64 to seat it more securely. The apertures 80 align with the aperture 67 in the catcher lug 64 so that an attachment pin (not shown) can be received therethrough and connect the central engine attachment link 36 to the catcher lug 64. During normal operation at least one of the apertures 80, 67 is oversized to define a clearance around the attachment pin so that no load is transferred during normal operation. However, in the event of a failure of the attachment pins, first 66 or second lobes 68 in the normal load path the clearance in the third lobe 70 is taken up and engine loads are transferred through the catcher lug 64 instead.

Figure 7:
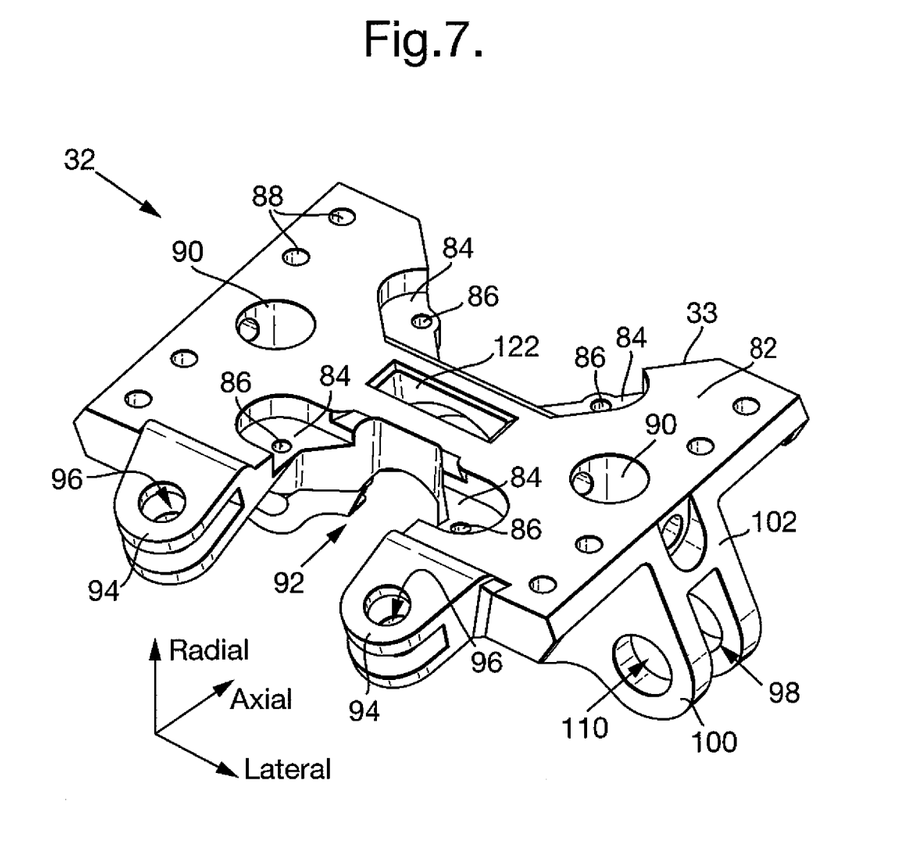
FIG. 7 is a perspective view of a main mount block of the rear engine mounting apparatus according to the present invention.

The main mount block 32 can be seen more clearly in FIG. 7, and comprises a substantially rectangular block with a profiled rear edge 33 such that the axial length is greater at the lateral edges than in the centre of the block 32, which reduces weight without compromising strength. The upper surface 82 of the main mount block 32 is substantially planar and arranged to abut the underside (radially inner surface) of the yoke carrier block 30. Recessed portions 84 are provided which correspond to, and in use receive, the feet 45 of the yoke carrier block 30. Attachment bolts 50 are received through the apertures 46 in the feet 45 and extend into corresponding apertures 86 in the recessed portions 84 to secure the yoke carrier block 30 to the main mount block 32. The underside of the yoke carrier block 30 may abut the upper surface 82 of the main mount block 32, providing additional rigidity. The yoke carrier block 30 provides a secondary bridging reinforcement across the centre of the main mount block 32 to prevent propagation of vertical cracks so as to prevent the main mount block 32 splitting in two.

There are apertures 88 (only some are indicated for clarity) provided through the main mount block 32 in a spaced row parallel to each lateral edge of the main mount block 32. These apertures 88 are arranged to receive attachment bolts to secure the main mount block 32 to the pylon. Additional shear pin apertures 90 may be provided laterally inwardly of the apertures 88 to receive shear pins extending from the pylon to transfer loads from the engine 210, through the main mount block 32 and thence to the pylon of the aircraft. These shear pin arrangements may be in additional to the shear pin apertures 48 provided in the yoke carrier block 30 for transferring normal engine loads. Alternatively, they may define a clearance around the corresponding shear pins so that they act as catcher shear pins (meaning no load is transferred in normal operation of the rear engine mounting arrangement 22 but an alternative load path is provided in the case of a failure of one or more of the shear pins in the normal load path).

The main mount block 32 includes a cutaway section 92 in its forward edge to accommodate, in use, the tongue 42 of the yoke carrier block 30. On either lateral side of this cutaway section 92 there are catcher devises 94 comprising a pair of lugs as is well known in clevis design. Each catcher clevis 94 comprises an aperture 96 through its lugs. The catcher devises 94 are arranged to receive, in use, the balance yoke 58 between their lugs. There are apertures provided in the balance yoke 58 to align with the apertures 96 in the catcher devises 94. A pivot pin (not shown) is inserted through each aperture arrangement to hold the components in pivotable relation. The apertures 96 through the catcher devises 94 are provided with a clearance gap around their pivot pins so that no load is transferred through them during normal operation of the rear engine mounting arrangement 22.

In the event of a failure of the tongue 42 of the yoke carrier block 30, the clearance around the pivot pins through the catcher devises 94 is taken up and engine loads are transferred from the balance yoke 58, through the catcher devises 94 and thence to the aircraft pylon in the alternative load path.

A clevis 98 is defined between forward and rear walls 100, 102 extending from the underside of the main mount block 32 towards the engine 210 (not shown). The forward and rear walls 100, 102 define four apertures 104, 106, 108, 110 symmetrically distributed across their lateral width, as can be seen more clearly in the exploded component view of FIG. 8. These apertures 104, 106, 108, 110 are arranged to receive a pivot pin (not shown) through each. A cutaway section 112 is located between the middle two apertures 106, 108. The cutaway section 112 is profiled to complement the central engine attachment link 36, particularly the third lobe 70 thereof. The spacing of the forward and rear walls 100, 102 is substantially the same as the front and back lugs 76, 78 of the third lobe 70 of the central link 36 so that when correctly seated together, the front lug 76 and forward wall 100, and the back lug 78 and rear wall 102, are planar and present substantially continuous surfaces. The second lobe 68 of the central link 36 is arranged to seat within the clevis 98 formed by the forward and rear walls 100, 102 so that the aperture 74 through the second lobe 68 aligns with axially extending apertures 108 through the walls 100, 102.

Figure 8:
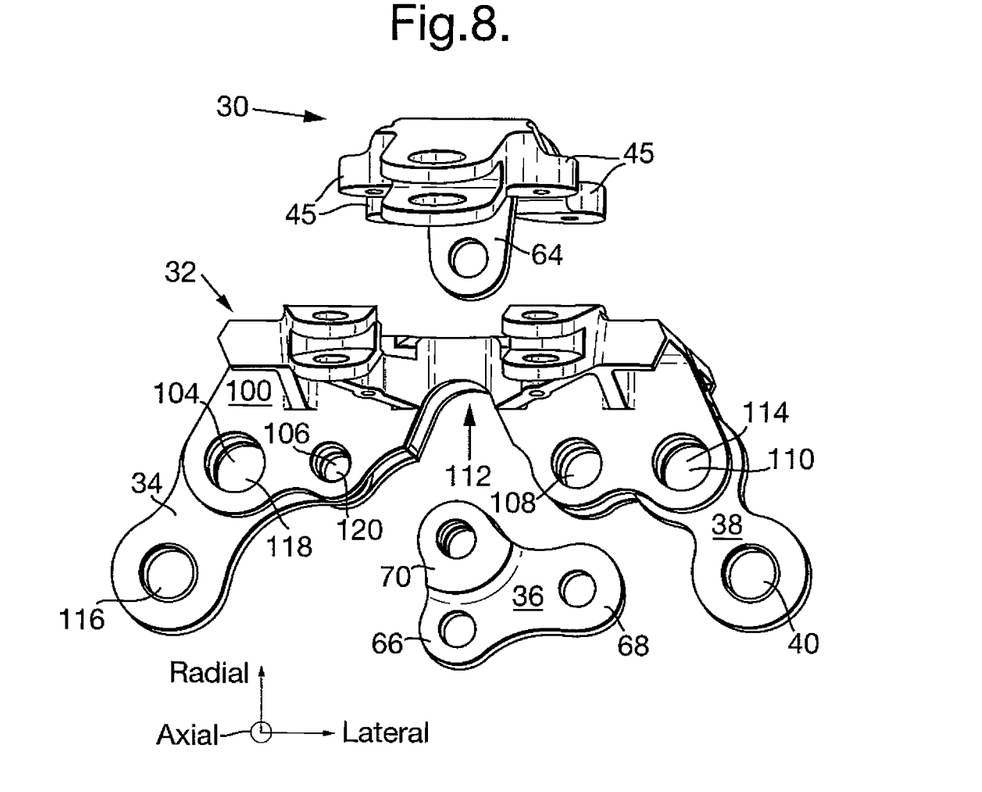
FIG. 8 is partially exploded front view of the rear engine mounting apparatus according to the present invention.

The port side engine attachment link 38 is elongate and comprises a pair of lobes, one at each end. The axial aperture 40 is defined through the lobe at the distal end of the link 38, which is arranged to seat within a clevis arrangement on the engine casing and be secured thereto by a pin 41 as previously described. At the proximal end of the link 38 is another axial aperture 114 defined through the other lobe. The link 38 seats, in use, within the clevis 98 formed by the forward and rear walls 100, 102 so that the axial aperture 114 through its proximal end aligns with the apertures 110 through the walls 100, 102. An attachment pin is inserted through the aligned apertures 114, 110 to secure the port side engine attachment link 38 to the main mount block 32.

The starboard side engine attachment link 34 is substantially L-shaped and oriented so that a first leg of the link 34 extends towards the engine 210 and the second leg of the link 34 extends parallel to the underside of the main mount block 32 and is located within the clevis 98 formed by the forward and rear walls 100, 102. At the distal end of the first leg of the link 34 is an axial aperture 116, which engages with a clevis on the engine casing in similar manner to the distal end of the port side engine attachment link 38. The starboard link 34 defines two further axial apertures 118, 120, one at the intersection of the first and second legs and the other at the distal end of the second leg. These apertures 118, 120 align, respectively, with the apertures 104, 106 through the forward and rear walls 100, 102. Preferably, at least one of the apertures in the aperture set 106, 120 define a clearance around their attachment pin so that it transfers no loads during normal operation of the rear engine mounting arrangement 22. Thus the normal load path from the engine 210 through the starboard link 34 and into the main mount block 32 is aligned through the centres of aperture 116 and aperture set 104, 118. In the case of a failure of the attachment pin through aperture set 104, 118 the clearance is taken up through the apertures 80, 67 in the third lobe 70 of the central engine attachment link 36 and the load transferred through the alternative load path comprising the central and port engine attachment links 36, 38.

The main mount block 32 further comprises a slot-shaped aperture 122, as shown in FIG. 7, which extends radially through the centre of the block 32. The slot-shaped aperture 122 is positioned and sized to receive the catcher lug 64 therethrough when the yoke carrier block 30 is secured to the main mount block 32. Thus the catcher lug 64 passes through the slot-shaped aperture 122, between the forward and rear walls 100, 102 of the main mount block 32 and into the clevis formed by the front and rear lugs 76, 78 of the third lobe 70 of the central engine attachment link 36. There is thus a redundant, alternative load path from the engine 210, through the central engine attachment link 36 and the catcher lug 64 directly into the yoke carrier block 30 and from thence, via the shear pins, into the aircraft pylon. Thus a crack propagating into the main mount block 32 does not affect the redundant load path since this transfers loads directly to the yoke carrier block 30 and thence to the pylon and bypasses the main mount block 32.

The engine attachment links 34, 36, 38 can take any suitable form as known in the art that provides the required redundancy. This is particularly the case for the port and starboard side engine attachment links 34, 38. The connection arrangement also provides a quick and simple method of detecting a failure case without requiring removal of the rear engine mounting arrangement 22. If the pivot pins located through the aperture pairs 106, 120; 80, 67 are able to rotate freely (unloaded) there is no failure. If one or both of these pivot pins is loaded, and therefore unable to rotate freely, there has been a failure and the rear engine mounting arrangement 22 should be removed, dismantled and repaired or replaced.

During normal aircraft and engine operation the engine to airframe loads take a normal load path comprising the following components: main mount block 32; starboard attachment link 34 via pins through the apertures 116, 104, 118; central attachment link 36 via pins through apertures 72, 74 in the first and second lobes 66, 68; and port attachment link 38 via pin 41 and the pin through apertures 110, 114.

There are three potential failure paths, dependent on which component fails. The first failure load path occurs when the central attachment link 36 fails. Thus the load path therethrough is replaced by loading of the pin through apertures 106, 120.

The second failure path occurs when the port attachment link 38 fails and therefore the load path through that is replaced by loading of the third lobe 70 of the central attachment link 36 and consequent loading of the catcher lug 64 and yoke carrier block 30.

The third failure path occurs when the starboard attachment link 34 fails and therefore replaces loading of this component by loading of the central attachment link 36, catcher lug 64 and yoke carrier block 30 as for the second failure path.

The various connections have primarily been described as clevis arrangements comprising a pair of lugs on one component and a single lug forming part of the other component to seat between the pair of lugs. However, the connections could equally be formed by providing the pair of lugs on the other component, or by providing a pair of lugs on each component forming an interleaving connection. Alternatively a single lug could be provided on each component. This reduces the weight of the components but removes some redundancy from the system. For example, the third lobe 70 of the central attachment link 36 could comprise a single lug and the catcher lug 64 could comprise a pair of lugs forming a clevis. In another example, the catcher devises 94 could comprise single lugs to be secured via pivot pins to the balance yoke 58 or the tongue 42 could comprise a single lug to be secured to the balance yoke 58.

In another alternative arrangement, a different system of connection could be substituted for any of the clevis arrangements hereinbefore described. Although the engine mounting arrangement of the present invention has been described as a rear mounting arrangement, it could alternatively be a front engine mounting arrangement.

Although the connection means have been described as attachment pins, pivot pins or attachment bolts, any suitable form of connection means may be substituted with equal felicity in the present invention. Preferably, such means are reusable in the sense that they can be removed and reapplied to enable dismantling and rebuilding of the engine mounting arrangement 22 for maintenance etc. However, other alternatives such as riveting or adhesive bonding may be appropriate in other situations.

Preferably, two catcher devises 94 are provided to transfer the thrust loads from the engine 210 via the balance yoke 58 in the event of a failure of a component in the normal load path. This provides the advantage that any crack in the normal thrust load path that propagates to fail the tongue 42 or upper and lower lugs 52, 54 cannot propagate to cause failure of the catcher devises 94. However, other arrangements comprising a single, or more than two, catcher devises 94 are contemplated within the scope of the present invention.

Although the engine attachment links 34, 36, 38 have been described in one configuration, the links may be mirrored with equal felicity, such that the port engine attachment link 38 is substantially L-shaped and the starboard engine attachment link 34 is substantially elongate. Other arrangements may also be possible without deviating from the inventive concept herein described.

What is claimed is:

1. An engine mounting arrangement comprising:
a main mount block connectable to an engine by at least one engine attachment link, the main mount block for transferring loads from the engine in a normal load path during normal operation of the engine mounting arrangement; and
a yoke carrier block, connectable to the main mount block, wherein the yoke carrier block is connectable to a further engine attachment link independently of the main mount block, the further engine attachment link being unloaded during normal operation of the engine mounting arrangement and arranged to transfer loads from the engine in the event of a failure of one or more components in the normal load path;

wherein the yoke carrier block comprises a catcher lug connectable to the further engine attachment link;

wherein the main mount block defines a clearance with respect to the catcher lug so that no load passes between them during normal operation of the engine mounting arrangement;

wherein at least one thrust strut is connectable to the yoke carrier block to transfer loads from the engine during normal operation of the engine mounting arrangement; and wherein the at least one thrust strut is connectable to the main mount block, the connection being arranged to be unloaded during normal operation of the engine mounting arrangement and to transfer loads from the engine in the event of a failure of one or more components in the normal load path.

2. An engine mounting arrangement as claimed in claim 1, wherein the yoke carrier block and main mount block are secured together.

3. An engine mounting arrangement as claimed in claim 1, wherein the catcher lug is coplanar with the at least one engine attachment link.

4. An engine mounting arrangement as claimed in claim 3, wherein the further engine attachment link is connected to the main mount block.

5. An engine mounting arrangement as claimed in claim 1, wherein the catcher lug extends through the main mount block.

6. An engine mounting arrangement as claimed in claim 1, wherein the connections comprise clevis and pin arrangements.

\* \* \* \* \*